Figure 1:
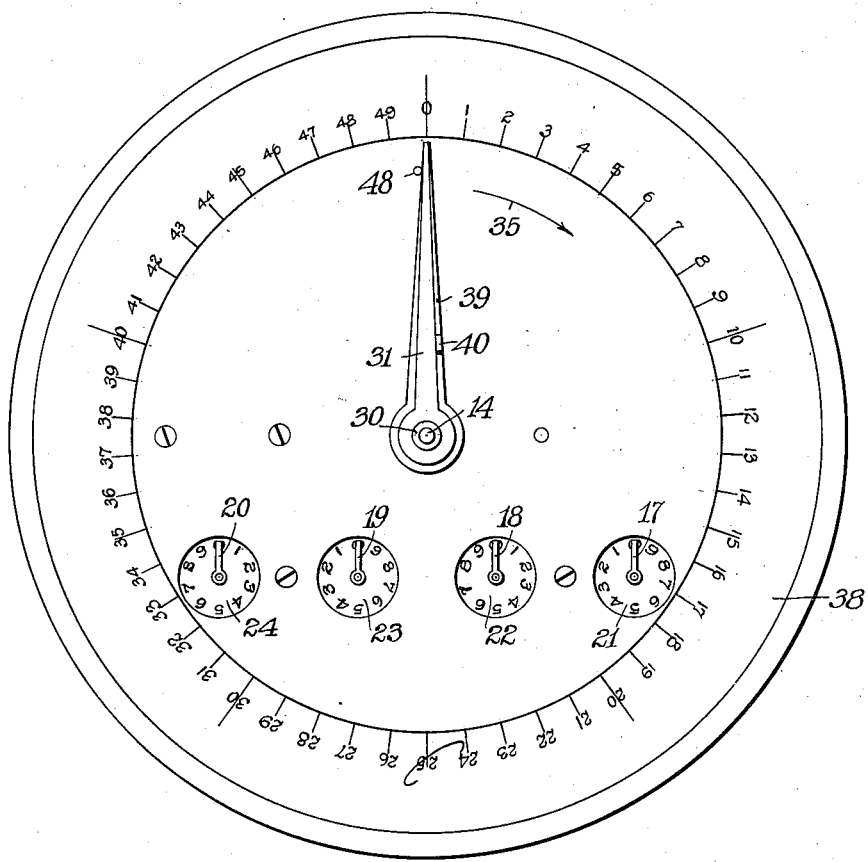

C. I. HALL.
MAXIMUM INDICATING AND WATT HOUR METER.
APPLICATION FILED AUG. 14, 1911.

1,028,715.

Patented June 4, 1912.
2 SHEETS—SHEET 1.

Witnesses:
Leonard W. Novander
Albm. C. Ahlberg

Inventor
Chester I. Hall
By Brown Williams
Attorneys

UNITED STATES PATENT OFFICE.

CHESTER I. HALL, OF CHICAGO, ILLINOIS, ASSIGNOR TO MINERALLAC ELECTRIC COMPANY, OF CHICAGO, ILLINOIS, A CORPORATION OF ILLINOIS.

MAXIMUM-INDICATING AND WATT-HOUR METER.

1,028,715.　　　　Specification of Letters Patent.　　Patented June 4, 1912.

Application filed August 14, 1911. Serial No. 643,839.

*To all whom it may concern:*

Be it known that I, CHESTER I. HALL, a citizen of the United States, residing at Chicago, in the county of Cook and State of Illinois, have invented a certain new and useful Improvement in Maximum-Indicating and Watt-Hour Meters, of which the following is a full, clear, concise, and exact description, reference being had to the accompanying drawings, forming a part of this specification.

My invention relates to apparatus for measuring the consumption of electrical energy and the variations in that consumption. I designate the apparatus of my invention as maximum indicating and watt hour meter.

In a general way my present invention is an improvement upon a simple apparatus for measuring and indicating the electrical supply as shown in Patent No. 722,030 of March 3, 1903, to C. H. Merz. It is in many respects also an improvement upon the maximum demand indicator, or meter, shown in my co-pending patent application Serial No. 612,052, filed March 3, 1911.

My present invention is an improvement upon the apparatus described in the co-pending application in providing a very much simplified, and consequently cheaper, apparatus for accomplishing all of the results of the apparatus shown in my co-pending application.

My present invention is an improvement on the Merz apparatus not only in the direction of simplification, but also in the production of an apparatus inherently more accurate than that of the Merz patent.

Generally stated, my present invention comprises a watt hour meter of any of the well known constructions, with which is associated a maximum indicating device, the advancement of which is controlled by the integrating watt meter mechanism. The watt meter is not called upon, however, to drive the maximum demand indicator, pointer, or other mechanism. On the contrary, the maximum demand indicating mechanism is driven by power supplied from an external source; such, for example, as a spiral spring. The integrating watt meter mechanism acts merely as an escapement to permit the advancement of the maximum indicating mechanism in accordance with the consumption of electrical energy which is measured by the watt meter. A clock closes the circuit of an electro-magnet at regular intervals, the electro-magnet acting when energized to return the driving part of the maximum indicating mechanism to its zero position.

The maximum indicating and watt hour meter of my invention is connected with an electrical power circuit in which it is desired to measure, not only the total amount of energy consumed, but in which it is desired also to make a record of the maximum energy consumption during any one of the regular intervals—of say, five minutes.

The integrating watt meter mechanism drives a register which can be read at the end of the month to determine the total energy consumption. The indicating mechanism is advanced during the first five minute period. The driving mechanism then returns automatically to its zero position. During the second five minute period the driving mechanism again advances, but if the consumption during the second five minute period is less than that during the first, the driving mechanism will not advance far enough to move the maximum indicator beyond the position to which it was advanced during the first interval. If, however, during the third five minute period the consumption is greater than it was during the first, the driving mechanism will advance the indicator to a higher position. The indicator remains at the highest position to which it may have been driven during any five minute interval, until the end of the month, when the meter is read and the meter reader returns the indicator to its zero position, whereupon the cycle of operations above described is repeated during the second month.

The charge for current is based partly upon the total consumption and partly upon the maximum consumption during a five minute period, as shown by the maximum indicator, the rate of charge ordinarily being higher when the maximum rate of consumption is disproportionately large, relative to the total energy consumption.

The details of my invention will be more clearly understood by reference to the accompanying drawings, in which—

Figure 2:
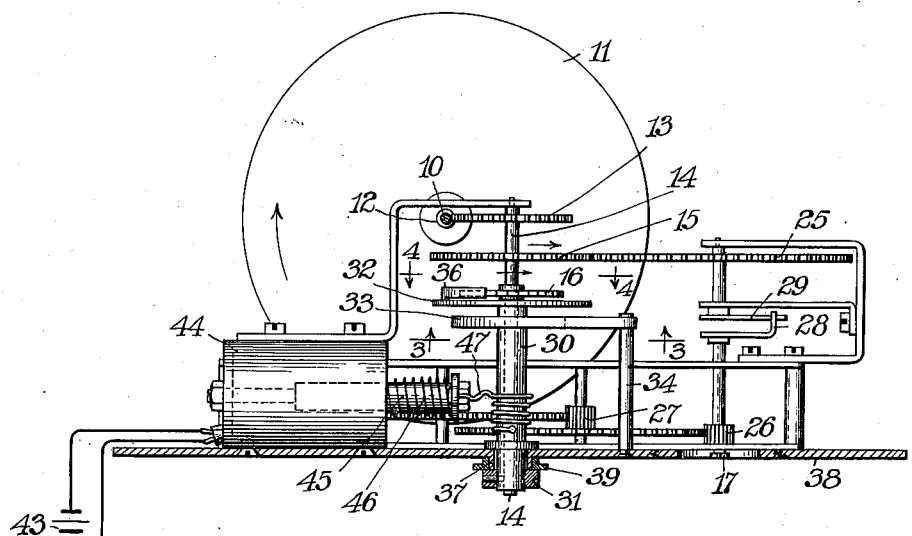
Figure 3:
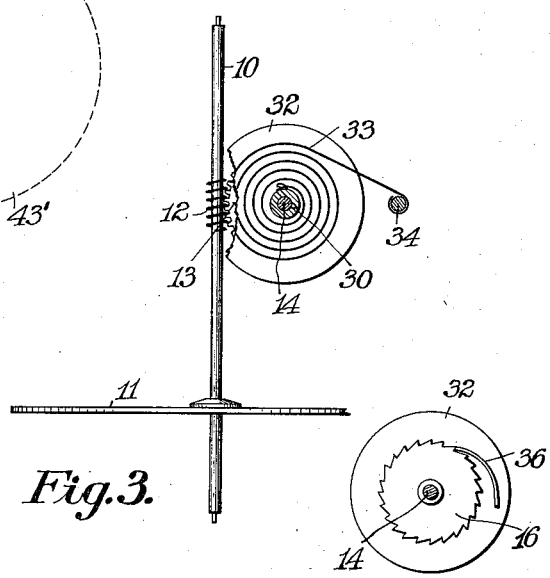
Figure 4:
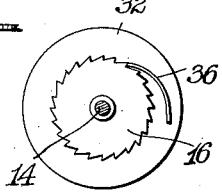

Figure 1 is a front view of a maximum indicating and watt hour meter constructed in accordance with my invention. Fig. 2 is a view largely in cross section and partly in diagram, showing the essential features upon which the operation of the apparatus of my invention depends. Fig. 3 is a somewhat diagrammatic view of the integrating watt meter spindle and the driving mechanism of the indicator. Fig. 4 is a detail view of the driving disk and the ratchet wheel with which it coöperates.

The same figures of reference are applied to like parts in all of the figures.

Since the details of construction and the mode of operation of the integrating watt meter *per se* are not involvel in my present invention, I have indicated merely the torque spindle 10 of a watt hour meter, the drag disk being indicated at 11. The meter spindle carries a worm 12, which meshes with the worm wheel 13 mounted upon a spindle 14. Upon this same spindle are also mounted the gear wheel 15 and the ratchet wheel 16.

The gear wheel 15 serves the purpose of driving the register of the watt hour meter, this register comprising the hands 17, 18, 19 and 20, each adapted to rotate over the face of the numbered dials 21, 22, 23 and 24, as best shown in Fig. 1. The rotation of the watt hour meter mechanism is communicated to the pointers or hands of the register, through the customary gearing, as indicated at 25, 26, 27 etc. In conformity with the usual practice, the motion of the meter mechanism is transmitted to the register proper through the crank 28 and axle arm 29. Stopping at this point to describe the part of the operation in which the register of the watt hour meter performs its function, it will be apparent to those skilled in the art that the torque producing mechanism of the watt hour meter, drives the hands of the register in the usual way to indicate the total consumption of electrical energy passing through the watt hour meter.

Coming now to a consideration of the part of the mechanism which is involved in showing the maximum consumption during the periodic intervals of time, attention should be directed to the quill shaft 30, which is loosely mounted to rotate on the spindle 14. At its front end the quill shaft carries the advancing pointer 31, while at the rearward end it carries the driving disk 32. At an intermediate point the spiral driving spring 33 is connected with the quill shaft, the outer end of the spring being attached to the supporting post 34. The spiral spring tends at all times to advance the quill shaft, the driving disk and the driving pointer in the direction of the arrow 35 of Fig. 1. The rotation of these parts is, however, prevented by the spring dog or pawl 36, attached at its outer end to the driving disk 32, and engaging at its inner end the teeth of the ratchet wheel 16.

The construction is such that the driving pointer 31 can be advanced only as the ratchet wheel 16 is permitted to advance. The advancement of the ratchet wheel 16 is controlled and determined by the rotation of the watt hour meter mechanism, wherefore the driving pointer 31 is advanced in exact conformity with the rotation of the watt hour meter mechanism.

Rotatably mounted upon a boss 37, carried upon the face of the main dial 38 of the instrument, is the indicating pointer 39. This indicating pointer has frictional engagement with the boss, such that it will stay in any position to which it is turned, except as it be rotated by the application of force. A driving pin or stud 40 projects forwardly from the indicating pointer 39, and the driving pointer 31 engages this driving pin of the indicating pointer when it is advanced under the power of the driving spring 33, as controlled by the watt hour meter mechanism. I think the balance of the construction will be best understood in conjunction with a consideration of the mode of operation of this part of the mechanism. As the torque producing mechanism of the watt hour meter advances in conformity with the consumption of energy, the ratchet wheel 16 is permitted to advance. This in turn permits the forward rotation of the driving disk 32, and with it the quill shaft 30 and the driving pointer 31, all under the tension of the driving spring 33. The driving pointer 31 engages the pin 40 to advance the indicating pointer 39. The advancement of these parts continues for a period of say, five minutes, when the contacts 41 and 42 are closed, due to the control exercised by the clock diagrammatically indicated at 43.

When the contacts 41 and 42 close circuit from the source of power, 43, through the resetting electro-magnet 44, the solenoid 45 of this magnet is drawn sharply to the left against the compression of the retracting spring 46. A string, or flexible cable 47, is wound about the quill shaft 30, one end of the string or cable being attached to the shaft, and the other being attached to the forward end of the solenoid 45, as shown. When the solenoid is energized, it pulls the string or cable until the driving pointer 31 is brought back into engagement with the stop pin 48 upon the face of the main dial. The spring pawl 36 slips lightly over the teeth of the ratchet wheel 16 to permit this return of the driving mechanism of the indicator to its initial position, without affecting in any way the position or operation of the watt hour meter mechanism. The energization of the electro-magnet preferably continues only long enough to return the driving mechanism of the indicator to its initial position, when energization of the electro-magnet is discontinued to permit the free advancement of the driving mechanism, as permitted by the rotation of the watt hour meter mechanism.

When the driving pointer or hand 31 is returned to its initial position, the indicating pointer 39 remains at the position to which it may have been driven during the first five minute interval. If during the second five minute period the driving hand 31 is advanced farther than it was during the first period, due to a larger consumption of energy during the second period than during the first, the indicating hand 39 will be engaged when the driving hand reaches the point to which it advanced during the last interval, and the two pointers will move together until the end of the second five minute period. At that instant the electro-magnet 44 will come into play to return the driving pointer to its initial position, leaving the indicating pointer at a position in advance of that to which it was driven during the first period, and where it will indicate the consumption of energy during the second five minute period. During the third five minute interval the consumption of energy may be less than during the second interval, in which case the driving pointer 31 will not be advanced far enough to engage the indicating pointer 39, with the result that the indicating pointer will remain in the position to which it was advanced during the second period. Thus it will be seen that at the end of the month the indicating pointer will be found in a position upon its dial corresponding with the consumption of electrical energy during that period in which the consumption was greatest.

When the meter reader reads the instrument, he makes note not only of the reading of the register of the watt hour meter, but also of the position in which he finds the indicating pointer 39. Having read the meter, he returns the indicating pointer to its zero position, or at least to a position in which it is engaged by the driving pointer 31. The instrument is now ready to record the consumption of energy and maximum demand for energy during the month to follow the reading.

My invention as above described, presents certain important advantages. It combines in a single instrument the mechanism for indicating or recording not only the total consumption, but also the maximum rate of consumption as measured over five minute periods, or over any other periods for which the clock mechanism may be set to control the circuit of the electro-magnet 44. The clock mechanism may be wound automatically by electrical means, or by hand as may be preferred, and it may be mounted within the case of the instrument, as shown in Fig. 1, if desired. This has the advantage of making the entire device self-contained, thereby simplifying the shipment and installation of the instruments and preventing tampering with the wires shown as leading to and from the electro-magnet 44.

The register of the watt hour meter mechanism puts upon the torque producing mechanism of that instrument, no more load than it carries in ordinary practice, and the use of the driving spring 33 in storing the power necessary to drive the indicating mechanism, enables me to use the ordinary integrating watt meters of commerce without change in making up the instrument of my invention, this possibility being due to the fact that the indicating mechanism of my invention places practically no additional load upon the watt hour meter mechanism; and in this connection it may be mentioned that the control of the indicating mechanism does not subject the torque producing mechanism of the watt hour meter, to varying loads and drags which must necessarily interfere with the accuracy of that part of the instrument.

The spring 33 is quite light, and operates always under a considerable number of tension producing turns, with the result that its pull upon the driving mechanism of the indicator is not appreciably changed by a complete rotation of the driving pointer 31, such a single rotation being the limit of movement of that pointer. In other words, the spring 33 acts like a long spring under a considerable strain, and where the strain is but slightly varied. The tension of the spring 33 is made such, furthermore, that it will just about balance the friction of the parts with which it is connected. Theoretically, of course the tangent of the angle of the threads of the worm 12 may be made identical with the coefficient of friction between the wheel 13 and the worm as determined by the tension of the spring 33, which acts through the driving disk 32 and the spring pawl 36 upon the spindle 14 and gear wheel 13, in which case the forces will just balance, and the spring 32 will have no tendency to rotate the spindle 10 of the watt hour meter, except as the tendency is absorbed in friction between the worm and worm wheel; and on the contrary, the indicating mechanism will have no drag or friction which must be overcome by force supplied by the spindle 10 of the watt hour meter. While it may not be necessary in practice to attain exactly this theoretical possibility, it is a very simple matter to attain this end within a close degree of approximation. It is scarcely worth while to attempt to attain this balance exactly at any one position of the mechanism, because the balance will not be exactly maintained at other positions in which the tension of the spring 33 must necessarily be slightly different. It is, I think, worth while however, to mention the theoretical desiderata toward which the practical approximations should tend.

Since the indicator mechanism is, in a way, merely floating with respect to the torque producing mechanism of the watt hour meter, the operation of the watt hour meter mechanism is not impaired nor varied to cause inaccuracies in its measurement of energy consumption.

Notwithstanding the high degree of accuracy which is easily attained in practice, the apparatus of my invention is very simple and can be manufactured at low cost.

A considerable factor in the simplification of the instrument lies in the use of a single electro-magnet 44, which acts not only to reset the driving mechanism of the indicator, but also as a means for winding the spring 33 to supply the power for driving the indicating mechanism, thus permitting it to float, subject to the control or guidance of the watt hour meter mechanism.

While I have described a preferred form of my invention, it will be apparent to those skilled in the art that modifications may be made without sacrificing the essential features upon which the invention depends. I do not, therefore, wish to be limited to the precise details heretofore described.

The following claims are the measure of the invention which I seek to cover by Letters Patent:

1. In a device of the class described, the combination of motor mechanism whose motion is proportional to and varies as the energy supplied to an electric circuit, a register driven by said motor mechanism, an indicator, a driving spring, indicator driving mechanism actuated by said spring, a gear connected with the motor mechanism, a pawl and ratchet connection between said gear and said driving mechanism, an electromagnet adapted upon energization to return the indicator driving mechanism to its initial position, and a clock-controlled switch for periodically closing the circuit of the electromagnet.

2. In a device of the class described, the combination of motor mechanism whose motion is proportional to and varies as the energy supplied to an electric circuit, a register driven by said motor mechanism, an indicator, a driving spring, indicator driving mechanism actuated by said spring, a gear connected with the motor mechanism, a pawl and ratchet connection between said gear and said driving mechanism, and clock-controlled mechanism adapted periodically to return the indicator driving mechanism to its initial position.

3. In a device of the class described, the combination of motor mechanism whose motion is proportional to and varies as the energy supplied to an electric circuit, an indicator, a driving spring, indicator driving mechanism actuated by said spring, a gear connected with the motor mechanism, a pawl and ratchet connection between said gear and said driving mechanism, an electromagnet adapted upon energization to return the indicator driving mechanism to its initial position, and a clock-controlled switch for periodically closing the circuit of the electromagnet.

4. In a device of the class described, the combination of motor mechanism whose motion is proportional to and varies as the energy supplied to an electric circuit, an indicator, a driving spring, indicator driving mechanism actuated by said spring, a gear connected with the motor mechanism, a pawl and ratchet connection between said gear and said driving mechanism, and clock-controlled mechanism adapted periodically to return the indicator driving mechanism to its initial position.

5. In a device of the class described, the combination of motor mechanism whose motion is proportional to and varies as the energy supplied to an electric circuit, a register driven by said motor mechanism, an indicator, a source of power independent of said motor mechanism tending to drive said indicator, a pawl and ratchet connection between said motor mechanism and said indicator, and clock-controlled mechanism for periodically resetting said source of power.

6. In a device of the class described, the combination of an integrating wattmeter comprising motor mechanism and a register driven thereby, an indicator, driving mechanism for the indicator, a spring normally under tension and supplying power to the driving mechanism, an escapement for the driving mechanism controlled by the motor mechanism, an electromagnet adapted upon energization to reset the driving mechanism to its initial position while storing power in the spring, and a clock-controlled electric circuit for periodically energizing the electromagnet.

7. In a device of the class described, the combination of an integrating wattmeter comprising motor mechanism and a register driven thereby, an indicator, driving mechanism for the indicator, a spring normally under tension and supplying power to the driving mechanism, an escapement for the driving mechanism controlled by the motor mechanism, and clock-controlled mechanism for periodically resetting the driving mechanism to its zero position while storing power in said spring.

8. In combination, a watt-hour meter comprising a register and a motor mechanism whose motion is proportional to the energy supplied to an electrical circuit, an indicator, a source of power independent of the motor mechanism to drive the indicator, an escapement for the indicator controlled by the motor mechanism, and clock-controlled mechanism for periodically returning the indicator driving mechanism to its initial position.

9. In combination, a watt-hour meter comprising a register and a motor mechanism whose motion is proportional to the energy supplied to an electrical circuit, an indicator, a source of power independent of the motor mechanism to drive the indicator, and an escapement for the indicator controlled by the motor mechanism.

10. In combination, an electric motor whose motion is proportional to and varies as the energy supplied to an electric circuit, an indicator, a source of power independent of the motor mechanism to drive the indicator, and an escapement for the indicator controlled by the motor mechanism.

11. In combination, an electric motor whose motion is proportional to and varies as the energy supplied to an electric circuit, an indicator, a source of power independent of the motor mechanism to drive the indicator, an escapement for the indicator controlled by the motor mechanism, and an electromagnet and clock-controlled energizing circuit for periodically returning the indicator and driving mechanism to its initial position.

In witness whereof, I hereunto subscribe my name this 12th day of August, A. D. 1911.

CHESTER I. HALL.

Witnesses:
HARRY J. WALLACE,
LEONARD W. NOVANDER.